May 26, 1953     W. A. MAGERKURTH     2,639,464
EXTRUSION APPARATUS

Filed Jan. 3, 1950     2 Sheets-Sheet 1

INVENTOR.
WILHELM A. MAGERKURTH
BY
Oberlin + Limbach
ATTORNEYS.

Patented May 26, 1953

2,639,464

UNITED STATES PATENT OFFICE 2,639,464

EXTRUSION APPARATUS

Wilhelm A. Magerkurth, Akron, Ohio, assignor to National Rubber Machinery Company, Akron, Ohio, a corporation of Ohio Application January 3, 1950, Serial No. 136,635

4 Claims. (Cl. 18—12)

The present invention relates generally as indicated to an extrusion apparatus and more particularly to certain improvements in a screw-type extrusion apparatus of the type for example including a cylinder into which unmelted or unheated material is adapted to be introduced and conditioned for extrusion by means of a feed screw rotated within said cylinder.

One primary object of this invention is to improve the efficiency of operation of the apparatus with reference to obtaining more uniform heating or cooling as the case may be, better working, less slippage, and more intimate blending of the heat plasticizable material to be extruded during the course of the travel of the material through the apparatus from the feed hopper toward the extrusion orifice.

Another object of this invention is to provide an extrusion apparatus which is rendered universal for use with a variety of different materials by the provision of a cylinder which comprises a bushing into which any of a series of liners is adapted to be inserted to thus vary the characteristics of the apparatus to best suit the particular material being extruded.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail several illustrative embodiments of the invention, these being indicative, however, of but a few of the various ways in which the principle of the invention may be employed.

In said annexed drawings—

Figure 1:
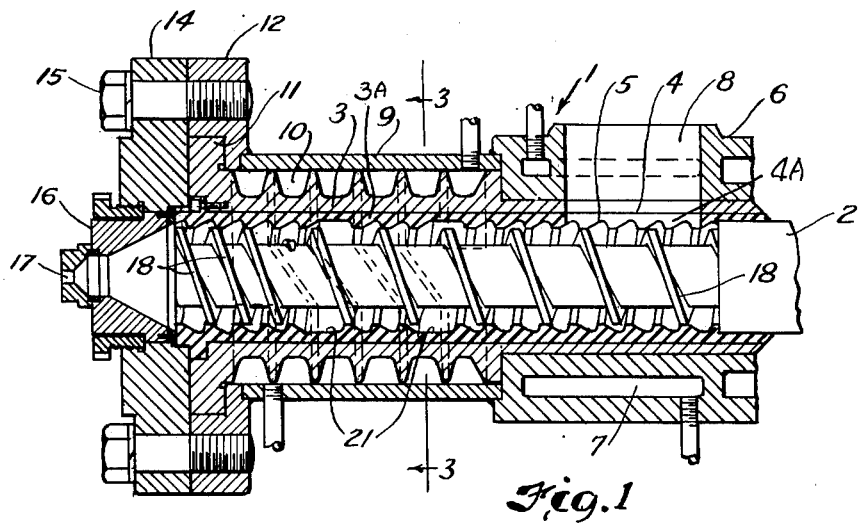
Fig. 1 is a diametrical cross-section view of one form of apparatus constituting the present invention.
Figure 2:
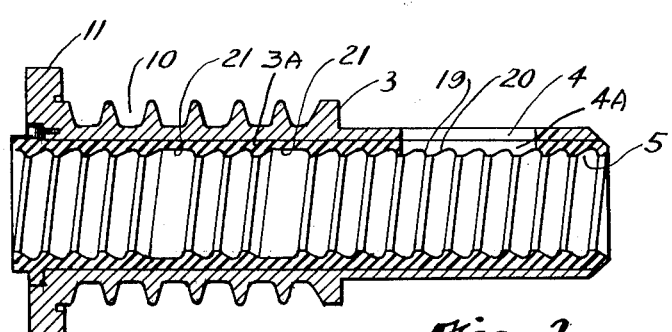
Fig. 2 is a diametrical cross-section view of the extrusion cylinder bushing and liner therein.
Figure 3:
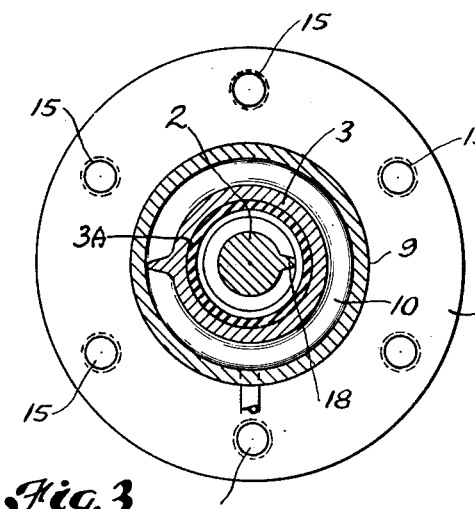
Fig. 3 is a transverse cross-section view taken substantially along the line 3—3, Fig. 1.

Referring now more particularly to the drawing and first to Figs. 1–3, the extrusion apparatus is herein exemplarily shown as comprising a cylinder assembly 1 in which an exteriorly threaded feed screw 2 of conventional form is adapted to be rotated by any suitable driving means (not shown) operatively connected to the right-hand end of the screw as viewed in Fig. 1.

Said cylinder assembly 1 in turn comprises (a) a cylinder bushing 3 formed with a lateral feed opening 4 adjacent one end and having a liner 3A snugly fitted thereinto and bolted in place as shown, said liner 3A being formed with an internally ribbed or threaded bore 5 therethrough in which the threaded portion of the feed screw 2 rotates and with a lateral feed opening 4A registering with opening 4 in said bushing, (b) a head 6 around such one end of said cylinder bushing chambered as at 7 for circulation of temperature modifying medium therethrough and provided with an opening 8 registering with the openings 4 and 4A in cylinder bushing 3 and liner 3A, and (c) a sleeve 9 or like enclosure encircling the remaining portion of said cylinder bushing 3 and forming with the groove 10 around the latter a continuous passage through which a temperature modifying medium is circulated for desirably heating or cooling material, as circumstances demand, which is adapted to be supplied into the cylinder and around the screw through the openings 4 and 4A while the material is being worked and forced under pressure toward the extrusion end of the apparatus responsive to rotation of screw 2 within said cylinder bushing 3.

Cylinder bushing 3 is further formed with a collar 11 which is clamped between a flange 12 on sleeve 9 and an adaptor head 14 through the expedient of bolts 15. In this way the cylinder bushing 3 as well as liner 3A is rendered readily removable from the extrusion end of the apparatus for servicing, requiring only the unscrewing of bolts 15 and removal of adaptor head 14.

Although the bushing 3 and liner 3A may be integral, it is however preferred to make them separate as shown, whereby the bushing may be made of magnesium treated iron or like metal and the liner may be made of high strength and wear and corrosion resistant metal such as stainless steel, stellited steel, chrome-plated steel, or the like to effectively resist the pressure, heat, and abrasive action of the material adapted to be worked therein.

The adaptor head 14 carries a die assembly 16 therein providing an extrusion orifice 17 through which the material which is worked and plasticized by the cooperative action of screw 2 and temperature-controlled cylinder bushing 3 and liner 3A is adapted to be forced.

The apparatus thus far described is more or less conventional and well known in the art with the exception that the threads or ribs 5 in said liner 3A, as best shown in Figs. 1 and 2, run in the same direction as the threads 18 on screw 2, said threads or ribs 5 preferably having less lead than the threads 18 and preferably being of buttress form with the front faces 19 thereof more nearly radial with respect to the cylinder than the rear faces 20. Said liner 3A is also formed with one or more threadless or ribless undercuts 21 (herein two such undercuts being shown) of diameter at least as great as the major diameter of the threads 5 to thus provide a corresponding number of annular mixing or blending chambers surrounding the screw 2. Said mixing chambers or reservoirs are preferably located within the heated or temperature-controlled portion of cylinder bushing 3, one being near the middle of such portion and the other being adjacent the end of such portion which is remote from the extrusion end of the apparatus. As shown, the minor diameter of the threads or ribs 5 is substantially the same as the major diameter of the threads 18.

It is now apparent that when the feed screw 2 is rotated in the proper direction, heat plasticizable material in desired lump, pellet, shredded or like solid form, supplied into the cylinder bushing 3 through openings 8 and 4 will be forced toward the left as viewed in Fig. 1 and during such travel of the material the same will be plasticized and churned or worked by the co-action of the screw and cylinder.

Moreover, any slippage or rotation of the material within liner 3A will cause the rotating portion thereof to travel in a direction opposite to the direction of feed of the material effected by the threads 18 of screw 2. This opposing flow of portions of the material will cause a collection of material in the mixing chambers or reservoirs formed by the undercuts 21 thereby contributing to a large degree to the intimate blending and mixing of the material in a manner not even closely obtained with extrusion apparatuses employing cylinder walls without such mixing chambers or reservoirs. Also such tendency of reverse flow of portions of the material helps create greater back pressure on the material whereby to further improve the efficiency of the apparatus.

In addition, the employment of threads or ribs 5 of buttress form as shown causes the threads to more effectively oppose reverse movement of portions of the material and to offer less resistance to forward movement of the material.

In the present embodiments of the invention the threads 18 at the extrusion end of screw 2 are double threads to compensate for reduction in the bulk of the material as it is plasticized, such double threads enabling extrusion of the material under greater pressure. The same general effect may, of course, be obtained by employing threads on the feed screw of diminishing pitch toward the extrusion end of the apparatus. These expedients are, of course, wel known in the art and the present invention is not therefore especially concerned therewith. Moreover, although the cylinder liner 3A and other liners hereinafter disclosed are internally threaded, it is to be understood that the inclined ribs may be otherwise formed.

Figure 4:
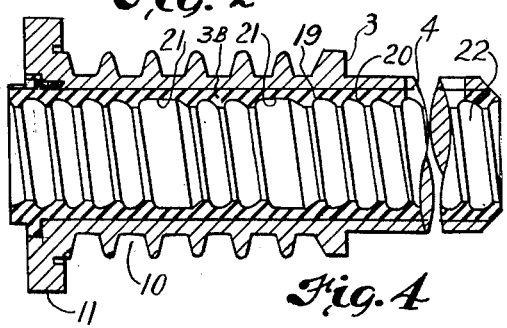
Fig. 4 is a view similar to Fig. 2 except illustrating a modification.

It is to be noted that the liner 3B as best shown in Fig. 4 may be provided with threads or ribs 22 which are inclined in a direction opposite to the inclination of the threads 18 on screw 2 in which case certain additional advantages of the invention are realized. With such construction, slippage or rotation of the material within said liner 3B will cause the portion of the material engaged with ribs 22 to be urged toward the extrusion orifice 17 to thereby facilitate clearing out of the apparatus. However, even in the case of such slippage of the material in said liner, the differences in the angles of inclination or leads of ribs 18 and 22 of the feed screw and liner respectively will effect travel of the portions of the material engaged with ribs 18 and the portions of the material engaged with ribs 22 in a direction axially of the screw at different rates of speed whereby again, as in the Figs. 1 and 2 construction, intimate blending and mixing of material is effected in the chambers or reservoirs defined by the undercuts 21.

Figure 5:
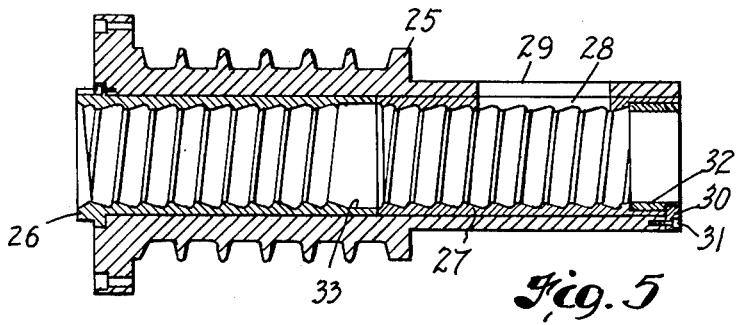
Figs. 5–8 are cross-section views of several other modifications in which the liners comprise two or more abutting sections.

In Fig. 5, the cylinder bushing 25 is generally similar to the one previously described except that provision is made for inserting thereinto a linear which comprises two abutting sections 26 and 27, said section 26 being bolted to the head end of the bushing 25 and said section 27 being non-rotatably secured in said bushing with its lateral feed opening 28 in register with opening 29 in said bushing as by means of the key 30 which is fitted into aligned radial slots in the ends of said bushing and section and secured in place as by cap screws 31. In addition, the end of section 27 is counterbored to receive a bronze or like bushing 32 constituting a bearing for the feed screw 2, said bushing 32 also being formed with a slot at its end into which the key 30 extends.

In the present case there is one mixing chamber or reservoir 33 formed by a counterbore in either or both sections, herein section 26, and as evident it is possible with right and left-hand threaded or ribbed sections 26 and 27 to make up several combinations, for example one as shown, another with left-hand threads or ribs in both sections, and two other combinations in which one section has left-hand threads or ribs and the other section has right-hand threads or ribs. These threads or ribs in the liner sections 26 and 27 will function in the manner indicated with reference to Figs. 1-4 and thus it is a simple matter to select the combination of sections which produces the best extruded product with the particular material which is being extruded.

Figure 6:
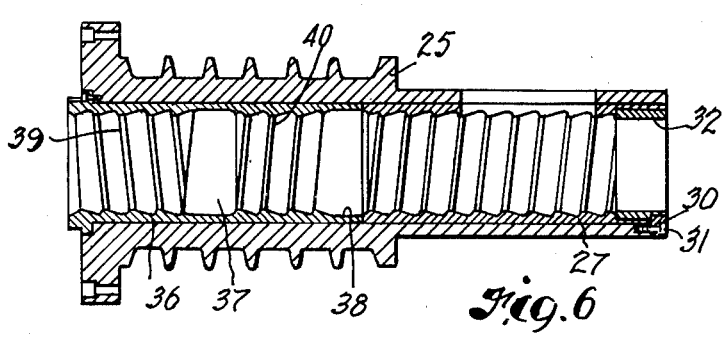
Figure 7:
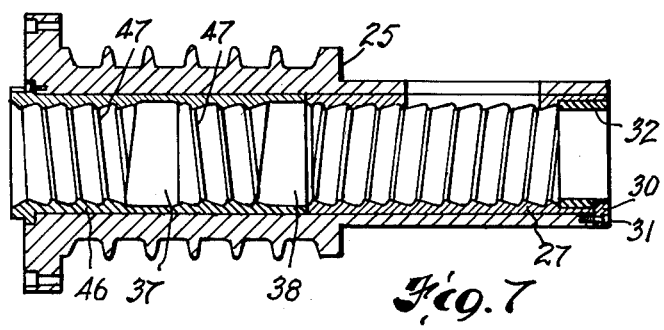

In the embodiments of the invention illustrated in Figs. 6 and 7 the bushing 25 again is fitted with a two-piece liner which in Fig. 6 comprises abutting sections 36 and 27 and in Fig. 7 comprises abutting sections 46 and 27, the former of which sections are each formed with an undercut 37 and a counterbore 38 defining a pair of mixing chambers or reservoirs, and the latter of which sections are preferably the same as in Fig. 5 and again held in place in the respective bushing 25 by key 30 and each carries a bushing 32. In Fig. 6 the section 27 may again be provided with either right-hand or left-hand threads, right-hand threads being shown herein, whereas the section 36 has left-hand threads 39 (or right-hand, if desired) on one side of undercut 37 and right-hand threads 40 (or left-hand, if desired) on the other side of undercut 37 and between said undercut and counterbore 38, and in Fig. 7 the section 46 has either right or left-hand threads on both sides of undercut 37, left-hand threads 47 being shown.

As evident, here again a variety of combinations of left and right-hand threaded liners with two mixing reservoirs may be devised to best suit the particular material being extruded, it being further noted that the sections 27 in Figs. 6 and 7 are preferably the same as left and right-hand threaded sections 27 in Fig. 5 whereby with two opposite threaded sections 36 and with two oppositely threaded sections 46 it is possible to quickly make up a preferred two reservoir combination with a desired one of the sections 27.

In operation of the particular combination illustrated in Fig. 6, the right-hand threads in section 27 and the right-hand threads 40 between the reservoirs 37 and 38 have the tendency of establishing a reverse flow of material whereby to build up the back pressure thereon and to effect intimate blending and mixing of material in reservoir 38. On the other hand, the left-hand threads 39 in section 36 tend to help clearing out of the material from the cylinder while yet effecting desired blending in reservoir 37 by reason of differences in the pitch of the threads in the liner as compared with the greater pitch of the threads on the feed screw as previously pointed out. In the event that the threads are reversed throughout the liner then there is the tendency to force more material for intimate mixing into reservoir 38 from both the left-hand threads 40 in section 36 and the left-hand threads of section 27 and the further tendency to build up the back pressure at a region closer to the extrusion end of the apparatus by reason of the right-hand threads 39 in liner sections 36 while yet effecting efficient blending in reservoir 37.

The operation of the Fig. 7 modification as shown or with the threads reversed may be similarly analyzed and thus need not be repeated. In any case, therefore, owing to the peculiar characteristics of each thermoplastic or other material which it is desired to work and plasticize, a superior combination may be created by selectively assembling the sectional liners disclosed herein. Moreover, although the undercut 37 and counterbore 38 are both shown as being in the respective sections 36 and 46, both or one of them may be in the form of separate pieces keyed to adjacent sections or be incorporated in the other section 27.

The modification in Fig. 8 again comprises a bushing 25 which has fitted thereinto a multisection liner, said liner comprising a head end section 56 bolted to said bushing and formed with right-hand threads (or left-hand, if desired), a feed box end section 57 secured in place as by the key 30 as in other forms of the invention and formed with right-hand threads (or left-hand, if desired) and an intermediate section 58 with left-hand threads (or right-hand, if desired) and with counterbores 59 at opposite ends forming a pair of reservoirs with the adjacent abutting sections 56 and 57. Said intermediate section is non-rotatably keyed into place as by the interfitting projection 60 and notch 61, said projection being optionally on one or another of sections 56, 57, and 58 and said notch being formed in an adjacent section. Obviously, the counterbores 59 may be contained in further separate sections if desired or comprise counterbores in one or both of the sections 56 and 57 in which case the intermediate section would be threaded throughout its length.

Figure 8:
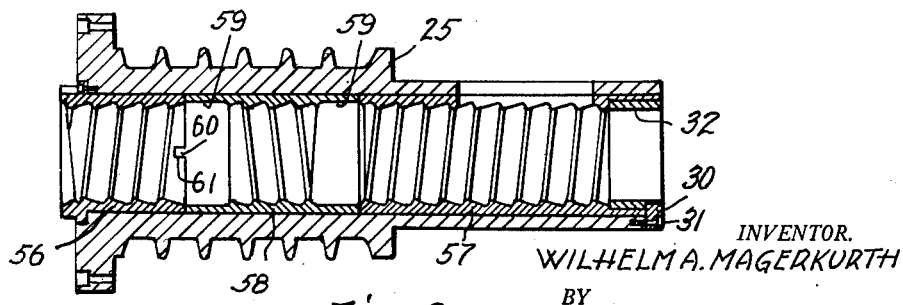

Inasmuch as the operation of the Fig. 8 modification, made up in any of its several combinations to best suit the material being extruded, is the same as any of the other liners with two reservoirs, repetition thereof is not deemed necessary.

From the foregoing it can now be seen that a multitude of left and right-hand threaded liners with one, two, or more mixing and blending reservoirs may be fabricated from a relatively few different forms of liners. In this way the extruder is rendered universal and may be used to extrude any of a wide variety of materials with equal facility for producing uniform, high quality extruded products.

As previously indicated the liners and bushings of all of the forms of the invention disclosed may be integral but for sake of economy it is preferred to have the liners separate whereby only the liners need be replaced from time to time, and it is also preferred to have the liners made in the form of interchangeable abutting sections whereby to enable creation of a multitude of different combinations of right and left-hand threaded or ribbed cylinder bores having one or more intermediate mixing reservoirs, with but a relatively few different liner sections. It is also to be noted that in each instance the liners, whether in one piece or several, are readily removable from the head or die end of the apparatus.

Other modes of applying the principle of the invention may be employed, change being made as regards the details described, provided the features stated in any of the following claims, or the equivalent of such, be employed.

I therefore particularly point out and distinctly claim as my invention:

1. Extrusion apparatus comprising an internally threaded cylinder formed with a feed opening and a discharge opening at its opposite ends for material to be extruded, an extenally threaded feed screw in said cylinder operative when rotated relative to a body of material introduced into said cylinder through the feed opening to cause flow of the material toward the discharge opening, the threads in said cylinder and on said screw being of the same hand and extending continuously around the same longitudinal portions of said cylinder and said screw whereby the threads in said cylinder induce a counterflow of the portion of the material rotating therein for intimate blending and mixing with the material flowing in the opposite direction under the influence of said feed screw.

2. Extrusion apparatus comprising a cylinder formed with a continuous internal helical rib therearound, and a feed screw rotatable in said cylinder and formed with a continuous external helical rib within such internal helical rib of major diameter substantially equal to the minor diameter of such internal rib, said cylinder for a minor portion of its length being formed with a ribless undercut leaving full ribs thereadjacent which form an annular mixing chamber for material adapted to be introduced into said cylinder and forced to flow therealong by rotation of said screw, the ring of material held in such chamber by the full rib thereadjacent against flow in a rearward direction relative to the flow of the material induced by rotation of said screw having an opportunity to expand and to roll around in such chamber for intensive mixing during rotation of said screw.

3. Extrusion apparatus according to claim 1 characterized further in that said cylinder for a minor portion of its length is formed with a threadless undercut leaving full threads thereadjacent which forms an annular mixing chamber for the material flowing through said cylinder under the influence of said feed screw.

4. Extrusion apparatus according to claim 2 characterized further in that the ribs adjacent to such annular mixing chamber are respectively left-hand and right-hand whereby, upon rotation of said feed screw, portions of the material rotating relative to said cylinder are induced to flow in opposite directions.

WILHELM A. MAGERKURTH.

References Cited in the file of this patent

UNITED STATES PATENTS

| Number | Name | Date |
|---|---|---|
| 869,307 | Jones | Oct. 29, 1907 |
| 1,849,291 | Gordon | Mar. 15, 1932 |
| 1,904,884 | Royle | Apr. 18, 1933 |
| 2,200,997 | Royle | May 14, 1940 |
| 2,242,364 | Montanari | May 20, 1941 |
| 2,547,151 | Braeseke | Apr. 3, 1951 |